United States Patent [19]

Fagerquist et al.

[11] Patent Number: 4,928,114

[45] Date of Patent: May 22, 1990

[54] AIR SKIVING SYSTEM FOR INK JET PRINTER START-UP

[75] Inventors: Randy L. Fagerquist; Wendell L. Wood; Frank W. Atkins, all of Dayton, Ohio

[73] Assignee: Eastman Kodak Company, Rochester, N.Y.

[21] Appl. No.: 265,101

[22] Filed: Oct. 31, 1988

[51] Int. Cl.$^5$ .............................................. G01D 15/18
[52] U.S. Cl. .................................... 346/75; 346/140 R
[58] Field of Search .............................. 346/75, 140 R

[56] References Cited

U.S. PATENT DOCUMENTS 4,122,457 10/1978 Erikson et al. ...................... 346/75
4,367,479 1/1983 Bower ............................ 346/140 R

*Primary Examiner*—Bruce A. Reynolds
*Assistant Examiner*—Gerald E. Preston
*Attorney, Agent, or Firm*—John D. Husser

[57] ABSTRACT

An improved system for air skiving the drop charging and drop catching surfaces of a continuous ink jet printer apparatus. The system includes a print head housing for enclosing the drop charger and catcher within a print head chamber having a printing drop egress and an air inlet opening proximate the drop charger. A door element is provided for selectively closing the printing drop egress and a vacuum is provided for creating a negative pressure region within the chamber at a location proximate the catcher. High velocity airflow is induced to flow through the air inlet opening and skive surfaces of said charger and catcher during passage to the negative pressure region.

2 Claims, 4 Drawing Sheets

AIR SKIVING SYSTEM FOR INK JET PRINTER START-UP

FIELD OF INVENTION

The present invention relates to ink jet printers of the "continuous" kind, and more particularly to improved constructions and methods for preparing such printers for printing operations, e.g. after a period of shutdown or upon detection of defective operation.

BACKGROUND ART

In general, continuous ink jet printing apparatus have an ink cavity to which ink is supplied under pressure so as to issue in a stream(s) from an orifice plate in liquid communication with the cavity. Periodic perturbations are imposed on the liquid stream(s), e.g. vibrations by an electromechanical transducer, to cause the stream(s) to break up into uniformly sized and shaped droplets. A charge plate is located proximate the stream(s) break-off point to induce an electrical charge to selected droplets in accord with a print information signal and charged droplets are deflected from their nominal trajectory. In one common (binary) printing mode, charged droplets are deflected into a catcher assembly and non-charged droplets proceed to the print medium.

The components described above (particularly the orifice plate and charge plate) should be precisely sized and positioned to achieve accurate placement of droplets on the print medium or on the catcher face. However, even after such careful manufacture, significant problems often are presented at each operational start-up of ink jet printers. First, any dried ink residue remaining from previous usage presents serious problems. For example, if such residue is on the charge plate it can cause shorting of the charge plate elements to ground or to each other, or cause improper charging of droplets, or interfere with the droplet trajectory. If the residue is on the lower print head structure (e.g. the operative catcher surface), it can cause ink splatter. Also, it is quite difficult to initiate the continuous droplet stream(s) along their nominal trajectories without some initial jet instability causing a partial wetting of the charge plate.

Prior art solutions to avoid charge plate shorting due to ink contamination have included: (i) manually cleaning the charge plate; (ii) providing a nearly instantaneous negative pressure at shut-down to avoid creating residue on he lower print head; (iii) moving the lower print head charge plate structure away from its operative position at start-up and (iv) providing a rapid pressure pulse in the image bar to force an initially straight start for the ink jets.

These solutions are all useful, but not without related difficulties or disadvantages. Manual cleaning of the charge plate is not desirable, particularly for office environment applications. Moving of the charge plate to avoid wetting during start-up adds mechanical complexity and causes great potential for inaccuracy in its proper alignment with the upper print head assembly's orifice plate. Using the "water-hammer" approach to achieve instantaneous start-up of the jets in their printing trajectory requires an extremely fast-actuation solenoid valve and rigid conduits. Also, this approach is unreliable in constructions where jet-to-electrode clearances are very small. Instant shut-down of the jets to avoid ink contamination on the charge plate has similar disadvantages and, in itself, will not solve the problem of accumulated residue on the lower print head structure.

U.S. Pat. Nos. 4,591,870; 4,600,928; 4,623,897 and 4,626,869 describe a series of procedures for improving the storage, start-up and periodic maintenance of continuous ink jet printer systems. These include wet storage of the print head, an ink flushing of the critical print head surfaces (e.g. orifice plate, charge plate and catcher surfaces), forced air skiving of liquid from those surfaces and subsequent condensate washing and drying of the surfaces. The start-up and maintenance of such printers is improved greatly by using all or even some of these procedures.

One potential problem has been found to exist in regard to the air skiving procedures described in U.S. Pat. No. 4,623,897. Specifically, air skiving has been effected by sealing the drop egress passage of the print head to a printer home station and forcing relatively high pressure air into an upper print head chamber. The pressurized air in the chamber flows into the drop egress passage, skiving ink off the critical surfaces, and discharges through the home station drain. This technique has been found to involve difficulties and costs in forming and maintaining effective seals between the print head and home station. Also, all print head frame portions that cooperate to enclose the print head chamber must be highly airtight. If air leaks are present in the frame, ink will be sprayed into the printer mainframe by the high air pressure provided for such skiving. This would be very undesirable.

SUMMARY OF INVENTION

One important object of the present invention is to provide an air skiving system that assists in start-up and maintenance of such printers, without the risk of ink spraying into the printer mainframe. A significant advantage of the present invention is that it achieves the stated object without the cost and labor expenses connected with critical airtight seal installation and maintenance. Another important advantage of the present invention is that it simplifies printer constructions, e.g. eliminating a forced air blower system, and in some embodiments, facilitates the elimination of a separate home station, and thus remote print head operation.

In one aspect the present invention constitutes an improved air skiving system for a continuous ink jet printer of the kind having a charge plate for inducing electrical charge selectively on droplet streams, a catcher for intercepting selected droplets and a print head housing that encloses the drop charge plate and catcher and has a print drop egress. The improved system for air skiving includes an air inlet opening in the print head housing proximate the charge plate; a door for selectively closing the print drop egress; and vacuum source for creating a negative pressure region within the print head chamber at a location proximate the catcher means. High velocity air is induced to flow through the air inlet opening and skive cross surfaces of the charge plate and catcher toward the negative pressure region.

BRIEF DESCRIPTION OF DRAWINGS

The subsequent description of preferred embodiments refers to the accompanying drawings wherein.

DETAILED DESCRIPTION OF PREFERRED EMBODIMENTS

Figure 1:
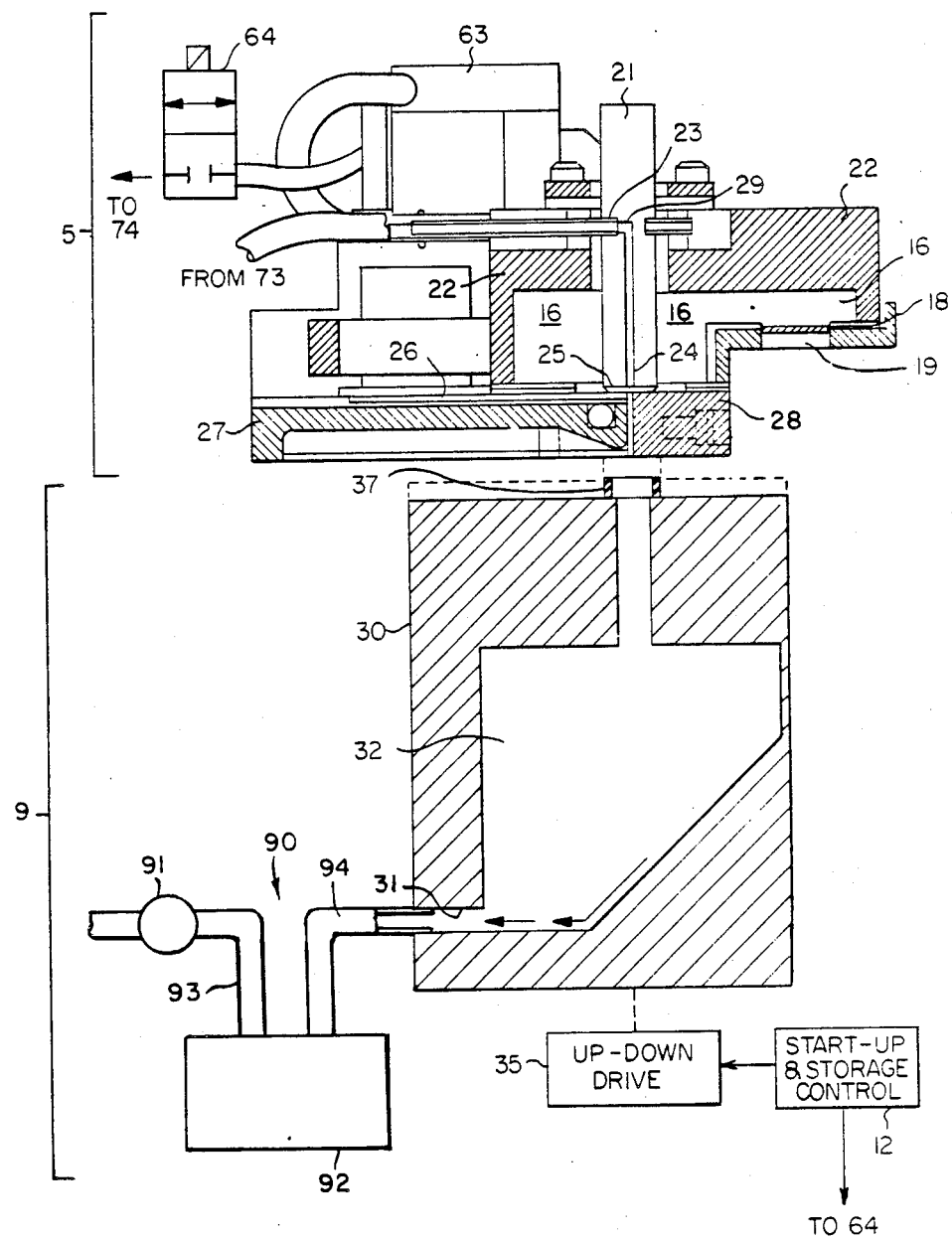
FIG. 1 is a schematic cross-sectional view illustrating upper and lower print head assemblies and their cooperation with a printer home station in accord with the present invention.
Figure 2:
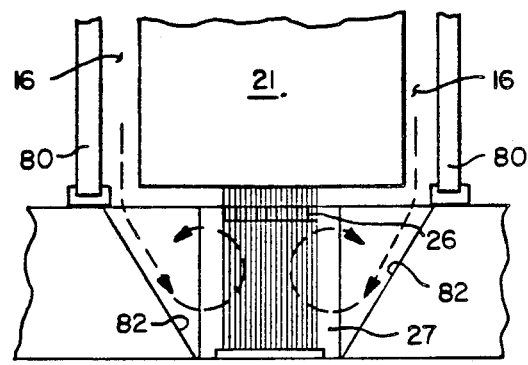
FIG. 2 is a front view of portions of the assemblies shown in FIG. 1.

Referring to FIG. 1, one embodiment of print head assembly 5 useful according to the present invention can be seen in more detail. The assembly 5 includes an upper print head portion including a print head body 21 mounted on housing 22 and having an inlet 23 for receiving ink. The body 22 has a passage leading from inlet 23 to one end of print head cavity 24 and an outlet 29, leading from the other end of the cavity 24 to the ink circulation system. The upper print head portion also includes an orifice plate 25 and suitable transducer means (not shown) for imparting mechanical vibration to the body 21 and orifice plate 25. Such transducer and orifice plate can take various forms known in the art for producing periodic perturbations of the ink filament(s) issuing from the orifice plate 25 to assure the breakup of the ink filaments into streams of uniformly spaced ink droplets.

The lower portion of print head assembly 5 includes a charge plate 26 constructed to impart desired charge upon ink droplets at the point of filament breakup and a droplet catcher device 27 having a face portion 27a (see FIG. 4) constructed and located to catch the charged, non-printing droplets. Exemplary preferred charge plate constructions are disclosed in U.S. Pat. Nos. 4,223,321 and 4,560,991. Exemplary catcher configurations are described in U.S. Pat. Nos. 3,813,675; 4,035,811 and 4,268,836. The lower print head assembly includes a predeterminedly configured and located wall member 28 that defines an air control passage and a printing outlet region as described in detail in U.S. Pat. No. 4,623,897.

The storage and start-up station 9, shown in FIG. 1, comprises a housing 30 having an ink sump 32 formed therein and an ink/air outlet passage from the lower region of the sump. The housing 30 is located adjacent the printing path of print head assembly so that the print head can be moved to the cooperative position overlying the housing. The housing embodiment shown in FIG. 1 is movable between the dotted-line and solid-line positions (toward and away from the print head assembly), e.g. by up-down drive 35; however, various other arrangements to provide the desired interrelations between the storage and start-up station 9 and print head assembly 5 will occur to one skilled in the art.

As shown in FIG. 1, the housing 30 includes sealing means 37 which are constructed and located to seal the interface regions of the sump 32 with the print head assembly from the surrounding apparatus environment when the housing is in the upper (dotted-line) position. The ink sump 32 is aligned to receive ink issuing from the orifice plate.

In accord with one embodiment of the present invention, a system 90 for applying a negative pressure at a lower region of the print head assembly includes a vacuum pump 91 coupled to the home station sump 32 via ink trap 92 and conduits 93, 94. The upper print head assembly frame 22 defines a chamber 16 having an inlet opening 18 thereto. Opening 18 is covered by an air filter 19, which is adapted to filter air, prior to its passage into the chamber 16, which, in turn, leads to the orifice and charge plate region of the print head assembly.

One preferred start-up mode of the present invention begins with the apparatus in the storage condition. An appropriate start-up command from control 12 actuates the print head ink supply pump (not shown) and flow control device 64 to spray ink through orifice plate 25 in a non-stable condition and impacting upon the surfaces of the charge plate 26 and catcher 27. This serves to remove dirt residing on those surfaces and redissolve ink that may have dried upon the surfaces.

After this sequence, it is desired to remove the wet ink from the charge plate and catcher assembly. Thus, under the control of start-up control 12, the ink streams from orifice plate 25 are shifted from cleaning to printing trajectories and a high velocity airflow can be provided to skive the wet ink from charge plate and catcher surfaces. As described in U.S. Pat. No. 4,623,897, the print head assembly 5 is constructed to receive air incoming through inlet 18 and direct it into a high velocity flow that skives residual wet ink from the charge plate and catcher surfaces. For this purpose, the chamber 16 and the wall member 28 are constructed so that the passage adjacent the operative surfaces of the charge plate 26 and catcher 27 will restrict the airflow from inlet 18 and cause the velocity of air through that passage to be high, e.g. ten times that of the ink jet velocity. Such high velocity airflow past the charge plate and catcher surface will skive the residual ink off of the charge plate and catcher surfaces. It is preferable to commence airflow at the same time ink jets are actuated to their nominal pressure. This effects removal of the ink as a sheet and gains assistance from the ink momentum and surface tension.

FIGS. 2–5 illustrate one construction that is preferred to channel the airflow in the direction required to physically sweep ink from the top surface and charging face of charge plate 26 and effect charge plate drying function without adversely affecting the necessary electrostatic charging and deflection processes of the printing mode of the apparatus. In FIGS. 2–5, the dashed lines represent what is believed to be the airflow patterns during the air skive cycle. As shown in the frontal view of FIG. 2, air from chamber 16 is directed between the resonator 21 and the walls 80 down between the catcher 27 and wall 28 (see FIG. 3). A large fraction of the total airflow moves along the inwardly tapered end edge surfaces 82 at a high velocity. This airflow effectively removes ink from the channel adjacent the ends of the charge plate.

Figure 3:
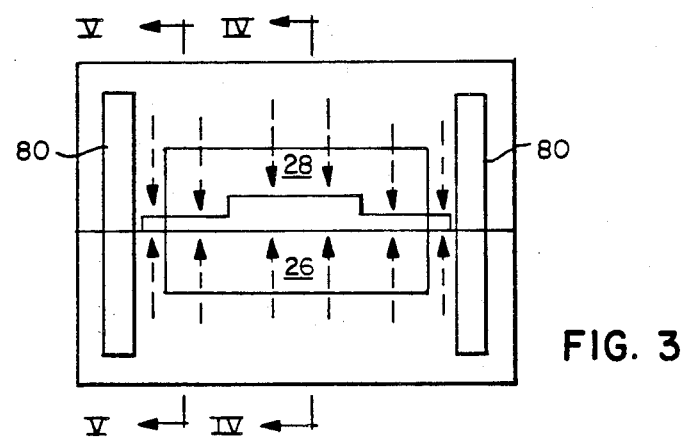
FIG. 3 is a top view of portions of the assemblies shown in FIG. 1.
Figure 4:
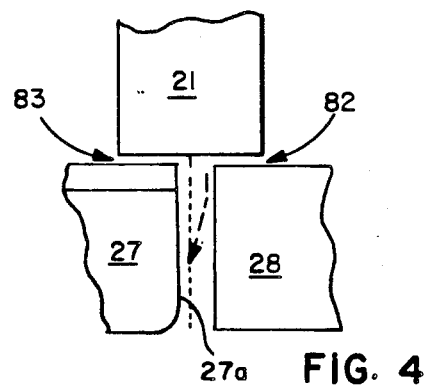
FIG. 4 is a cross-sectional view taken on the lines IV—IV of FIG. 3.
Figure 5:
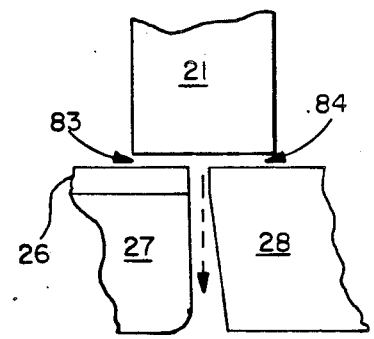
FIG. 5 is a cross-sectional view taken on the lines V—V of FIG. 3.

From the top view shown in FIG. 3, it can be seen that air also moves under the orifice plate into the regions over the top of charge plate 26 and wall 28. The amount of airflow under the orifice plate and over the top surface of wall 28 is roughly twice that over the top of the charge plate. This is effected by providing a difference in cross-sectional dimension of the respective passages 83 and 84 which are fed from the constant pressure plenum 16, see FIGS. 4 and 5. Also, as shown in those cross-sectional side views (FIGS. 4 and 5), there is approximately a three to one difference in the distance from the wall 28 to the charge plate 26 in the center of the orifice plate (FIG. 4) and the region outside the array (FIG. 5), respectively. The flow pattern that results from the geometry shown in FIGS. 4 and 5 produces Coanda wall attachment of airflow at the top edge of charge plate and causes air to flow across the electrodes on the face of charge plate 26 and effectively dry them. Also there is sufficient airflow to remove ink trapped above the charge plate 26 and wall 28. The desired skiving and drying performance can be obtained with many other geometries; the geometry illustrated in FIGS. 4 and 5 is particularly preferred for using a minimum required airflow rate, while allowing a relatively large spacing between charge plate 26 and wall 28.

Referring again to FIG. 1, the system of the present invention induces requisite airflow through inlet 18 instead of coupling a positive pressure air source to inlet 18, the embodiment of the present invention shown in FIG. 1 couples vacuum pump 81 to the sump 32 of home station 9 for this purpose. The negative pressure thus created at the lower print head assembly causes ambient air to inflow through inlet 18 (via filter 19) into chamber 16; and the constricted passages over the top of charge plate 26 and leading down past the charge electrode surfaces and catcher face, cause the induced airflow to reach the desired high velocity required to perform the skiving functions previously described. We have found that if vacuum system 80 provides for a 20 to 30 scfm airflow rate through the print head, performance equivalent to the prior art positive pressure approach is attained. Thus, the present invention provides the significant advantage of assuring that all "leaking" air passes into the home station, rather than being forced out into the printer mainframe, while still achieving the highly desirable air skiving cleaning function for the critical print head surfaces. In order to prevent ink from entering the vacuum pump 81 (and ink mist being discharged to the atmosphere), ink trap 82 is provided between sump 32 and pump 81.

Figure 6:
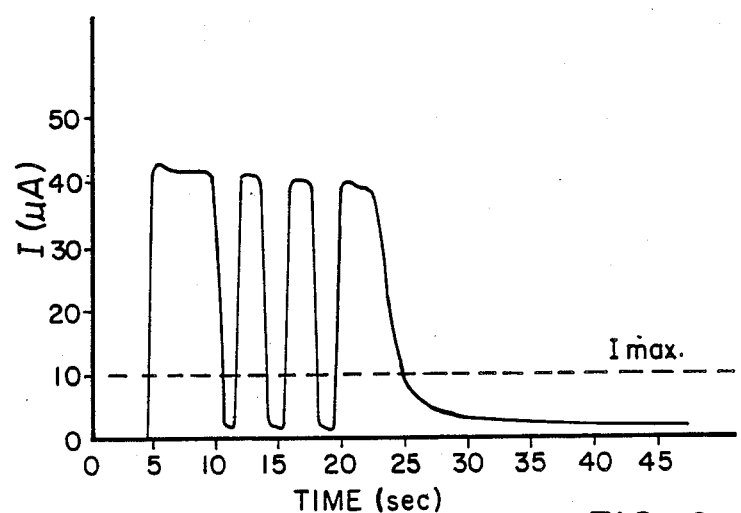
FIGS. 6 and 7 are graphs illustrating the performance of the present invention in comparison with the prior art blow-skive system discussed in the Background Art section.
Figure 7:
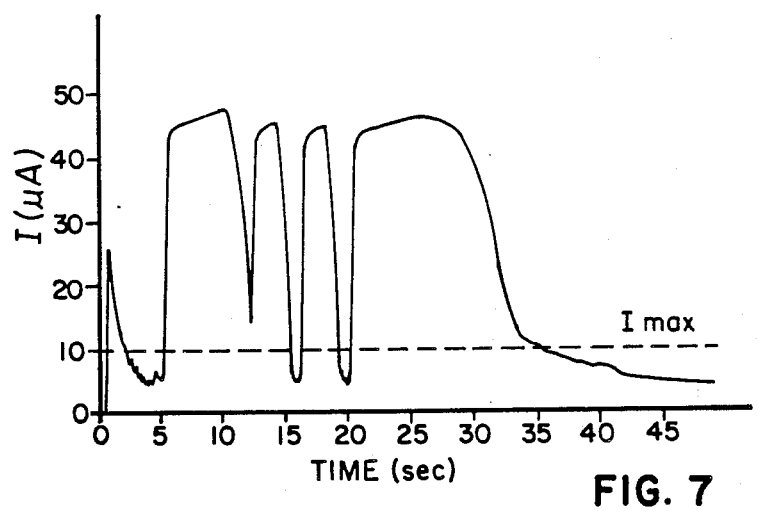

FIGS. 6 and 7 illustrate a comparison of the negative pressure skive (or "vacuum-dry") system of the present invention and the prior art positive pressure skive (or "blow dry") system. The FIGS. 6 and 7 plots are an indirect measurement of the amount of moisture found on the charge plate during print head cleaning and start-up operations. They were made by placing a potential difference between each set of adjacent charging leads and measuring the resultant current flow at various stages of the cleaning operation. When there is a relatively large amount of moisture on the leads, a larger current flows than when there is little or no moisture present.

The dashed lines ($I_{max}$) in FIGS. 6 and 7 show the maximum value the current between electrodes is allowed to have during the cleaning operation. In FIG. 6, which shows the blow dry system performance, the large dips in current occur when the air pump is on and the moisture is blown off the leads. The peaks in the current occur when the pump is off and condensation forms on the leads.

FIG. 7 shows the same current plot using the "vacuum-dry" procedure of the present invention. As can be seen by comparing the FIG. 6 and FIG. 7 plots, the vacuum-dry procedure results in essentially the same cleaning performance as that obtained from blow-drying.

Figure 8:
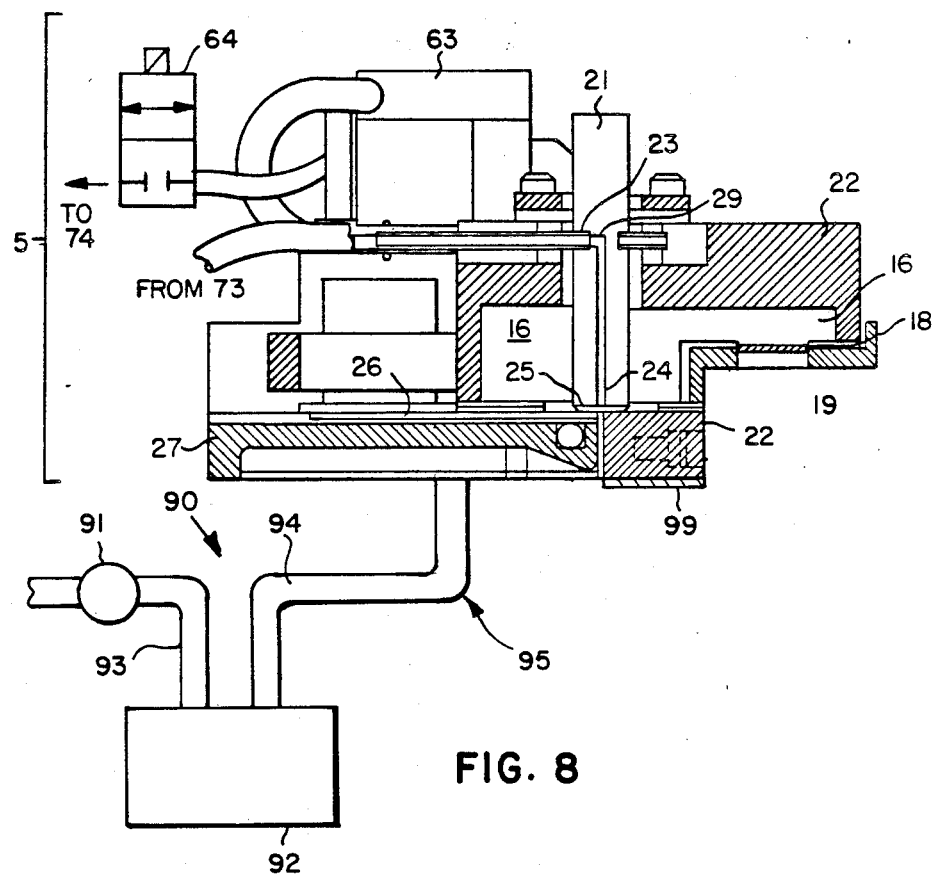
FIG. 8 is a schematic illustration of an alternative embodiment of the present invention.

Referring now to FIG. 8, another preferred embodiment of the invention, which eliminates the need for the home station 9 of FIG. 1, is illustrated. In this embodiment, the system 90 is coupled to the outlet of catcher assembly 27'. In addition, the lower print head assembly has a door 99 adapted to selectively open and close the drop egress passage between the catcher face and frame 22. The details of one preferred door construction are described in concurrently filed U.S. patent application Ser. No. 07/265102, entitled "Continuous Ink Jet Printer Having Remotely Operable Print Head Assembly", which is incorporated herein by reference. In order to effect the air skive cleaning function in accord with the FIG. 8 embodiment, the door 99 is moved to close the drop outlet passage and vacuum pump 81 is activated to create a negative pressure at the catcher outlet 85. The negative pressure is conducted via the catcher throat to induce inflow of ambient air through inlet 19 (via filter 18) as described with respect to the FIG. 1 embodiment.

The invention has been described in detail with particular reference to preferred embodiments thereof, but it will be understood that variations and modifications can be effected within the spirit and scope of the invention.

I claim:

1. In continuous ink jet printer apparatus of the kind having drop generator means for directing droplet streams toward a print zone, drop charging means for inducing electrical charge selectively on droplets of such streams, catcher means for intercepting selected droplets and returning them to an ink supply and print head housing means for enclosing the drop charging and catcher means within a print head chamber having a printing egress, an improved system for air skiving said drop charging and catcher means comprising:
   (a) means for defining an air inlet opening in said housing proximate said drop charging means;
   (b) air filter means located in said air inlet opening to filter air passing through said opening into said housing;
   (c) housing closure means for selectively opening and closing said printing egress;
   (d) actuatable vacuum means for creating a negative pressure region within said chamber at a location proximate said catcher means; and
   (e) control means for effecting an air skive sequence by effecting closing of said housing closure means and subsequent actuation of said vacuum means;
   whereby high velocity airflow is induced to flow through said air filter means and skive over surfaces of said charging and catcher means during passage to said negative pressure region.

2. The invention as defined in claim 1 wherein said actuatable vacuum means comprises:
   (i) an actuatable vacuum source located remotely from said print head housing; and
   (ii) conduit means coupling said vacuum source to said catcher means.

* * * * *